United States Patent
Jo

(10) Patent No.: US 7,876,479 B2
(45) Date of Patent: Jan. 25, 2011

(54) AUTOMATIC DOCUMENT FEEDER AND IMAGE FORMING APPARATUS HAVING THE SAME

(75) Inventor: Yong-kon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 931 days.

(21) Appl. No.: 11/745,648

(22) Filed: May 8, 2007

(65) Prior Publication Data

US 2008/0062477 A1   Mar. 13, 2008

(30) Foreign Application Priority Data

Sep. 13, 2006   (KR) .................... 10-2006-0088616

(51) Int. Cl.
  *H04N 1/04* (2006.01)
  *G03G 15/00* (2006.01)
(52) U.S. Cl. .................. 358/498; 359/396; 399/367
(58) Field of Classification Search ............... 358/498, 358/496; 271/3.14, 8.1, 291; 399/367, 361, 399/364
See application file for complete search history.

(56) References Cited

U.S. PATENT DOCUMENTS

| | | | | |
|---|---|---|---|---|
| 5,502,556 A * | 3/1996 | Yamada | ...................... | 399/374 |
| 5,784,680 A * | 7/1998 | Taruki | ........................ | 399/374 |
| 5,791,645 A * | 8/1998 | Takada | ...................... | 271/3.03 |
| 5,907,759 A * | 5/1999 | Yashiro | ..................... | 399/371 |
| 5,947,464 A * | 9/1999 | Takada | ...................... | 271/3.03 |
| 5,991,592 A * | 11/1999 | Kobayashi et al. | .......... | 399/374 |
| 6,393,251 B2 * | 5/2002 | Kono | ........................ | 399/370 |
| 6,529,259 B1 * | 3/2003 | Kono | .......................... | 355/23 |
| 6,915,102 B2 * | 7/2005 | Aoki et al. | .................. | 399/367 |
| 7,414,764 B2 * | 8/2008 | Shyu | .......................... | 358/498 |
| 7,431,282 B2 * | 10/2008 | Ohama | ........................ | 271/65 |
| 7,522,871 B2 * | 4/2009 | Tu | ............................. | 399/374 |
| 2003/0190179 A1 * | 10/2003 | Kinoshita et al. | ........... | 399/401 |
| 2006/0245802 A1 * | 11/2006 | Shimizu | .................... | 399/367 |
| 2007/0212140 A1 * | 9/2007 | Xu et al. | ..................... | 399/367 |

* cited by examiner

*Primary Examiner*—Jerome Grant, II
(74) *Attorney, Agent, or Firm*—Stanzione & Kim, LLP

(57) ABSTRACT

An automatic document feeder of an image forming apparatus capable of improving a duplex scanning or printing (copying) efficiency includes a single scan path having a document admission passage to admit a document to a document scanning part and a document discharge passage to discharge the scanned document, a duplex scan path having a first document reversing and waiting passage diverged separately from the document discharge passage on the single scan path at the rear of the document scanning part to reverse the document, one surface of which is scanned, and admit the reversed document again to the document scanning part, and a document re-reversing path having a second document reversing and waiting passage diverged separately from the document discharge passage on the single scan path at the rear of the document scanning part to reverse the document, both surfaces of which are scanned, again and send the re-reversed document to the document discharge passage.

32 Claims, 6 Drawing Sheets

AUTOMATIC DOCUMENT FEEDER AND IMAGE FORMING APPARATUS HAVING THE SAME

CROSS-REFERENCE TO RELATED APPLICATIONS

This application claims priority under 35 U.S.C. §119(a) of Korean Patent Application No. 10-2006-0088616 filed Sep. 13, 2006, in the Korean Intellectual Property Office, the entire disclosure of which is hereby incorporated by reference.

BACKGROUND OF THE INVENTION

1. Field of the Invention

The present general inventive concept relates to an image forming apparatus, such as a multifunction machine or a copier. More particularly, the present general inventive concept relates to an automatic document feeder of an image forming apparatus having a duplex printing function.

2. Description of the Related Art

Generally, an image forming apparatus, such as a multifunction machine, a copier, or the like, is provided with an automatic document feeder, which continuously and automatically feeds a document to be scanned onto a document scanning part of a scanner unit. The automatic document feeder usually has a single scan path, and a duplex scan path to reverse the document, one surface of which is scanned, and to admit(feed) the reversed document to the document scanning part.

FIG. 1 illustrates a conventional automatic document feeder. Referring to FIG. 1, reference numerals 1, 2, 10 and 20 represent a document feeder frame, a document scanning part, a single scan path, and a duplex scan path, respectively.

The single scan path 10 is provided with a document admission passage 12 to admit or feed a document D of a document supplying tray 11 to the document scanning part 2 and a document discharge passage 13 to discharge the scanned document. The duplex scan path 20 is connected from the document discharge passage 13 to the single scan path 10 at front of the document scanning part 2. In FIG. 1, reference numerals 14-17 and 21 represents document conveying rollers.

In a single printing mode, the document D is scanned passing through in turn, paths ⓐ, ⓑ, ⓒ, ⓓ, ⓔ, and ⓕ whereas in a duplex printing mode, the document D, both surfaces of which are scanned passing through the single scan path as described above, is scanned and discharged in a state that it is reversed passing through paths ⓖ, ⓗ, ⓒ, ⓓ, ⓔ, and ⓕ.

If the document having the both surfaces scanned is discharged through the duplex scan path 20 in the duplex printing mode, it requires that the document is discharged in a state that it is collated in the same page as that in an admission thereof in the document admission passage 12. For this, before being discharged, the document having the both surfaces scanned is to pass through the duplex scan path (paths ⓖ, ⓗ, ⓒ, ⓓ, ⓔ, and ⓕ) again.

As described above, in the duplex printing mode, after the preceding document is completely discharged passing through ⓐ, ⓑ, ⓒ, ⓓ, ⓔ, ⓕ, ⓖ, ⓗ, ⓒ, ⓓ, ⓔ, ⓕ, ⓖ, ⓗ, ⓒ, ⓓ, ⓔ, and ⓕ in turn, the following document is to be admitted into the document admission passage 12. Accordingly, a printing efficiency in the duplex printing mode is very low. In this case, the printing efficiency is no more than approximately 40% of that in the single printing mode.

To increase the printing efficiency in the duplex printing mode, a method is employed to shorten the duplex scan path and move a conveying roller away from a corresponding backup roller at a place where the documents overlaps each other. In this case, however, to collate and discharge the document having the both surfaces scanned, the document should pass through the duplex scan path again. Accordingly, there is a limit to increase the printing efficiency.

SUMMARY OF THE INVENTION

The present general inventive concept provides an automatic document feeder to scan a document and collate and discharge the scanned document having both surfaces scanned, thereby reducing a document admission interval in a duplex scanning or printing mode and thus improving a duplex scanning or printing efficiency in the duplex scanning, or printing mode.

The present general inventive concept also provides an image forming apparatus, which has the automatic document feeder as described above, thereby improving a scanning or printing speed.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an automatic document feeder of an image forming apparatus, in which a document discharge passage, a first document reversing passage to reverse a document to carry out a duplex scanning or printing mode, and a second document reversing passage to reverse the document again thus to collate it are formed separately from one another, so that while the document, both surfaces of which are scanned, is collated and discharged, a next document can be scanned.

The automatic document feeder may include a single scan path having a document admission passage to admit a document to a document scanning part and a document discharge passage to discharge the scanned document, a duplex scan path having a first document reversing and waiting passage diverged separately from the document discharge passage on the single scan path at the rear of the document scanning part to reverse the document, one surface of which is scanned, and admit again the reversed document to the document scanning part, and a document re-reversing path having a second document reversing and waiting passage diverged separately from the document discharge passage on the single scan path at the rear of the document scanning part to reverse the document, both surfaces of which are scanned, again and send the re-reversed document to the document discharge passage.

The automatic document feeder may further include a document guide unit formed at a diverging point of the first document reversing and waiting passage and the second document reversing and waiting passage to the single scan path to guide the scanned document to a corresponding passage.

The document guide unit may guide the scanned document to the document discharge passage in case of a single scanning or printing mode, whereas guide the document having the one surface scanned to the first document reversing and waiting passage and guide the document having both surfaces scanned to the second document reversing and waiting passage in case of a duplex scanning or printing mode.

The document guide unit may include upper and lower fixed guides disposed above and below the diverging point, respectively, a movable guide disposed to be rotatabe about an axis between the upper and lower fixed guides, and having an upper guide part, a lower guide part and a passage formed between the upper guide part and the lower guide part, and a rotation driving unit to rotate the movable guide in a position corresponding to a scanning mode.

The rotation driving unit may include a motor connected to the axis of the movable guide, and a control unit to determine the scanning mode and thus to control a drive of the motor.

The rotation driving unit may include an elastic member to elastically support the movable guide in one of an upward direction and a downward direction, a rotation pressing unit to rotate the movable guide by stages in an opposite direction to an elastic force direction of the elastic member, a sensor member to detect an initial position of the movable guide, and a control unit to determine a scanning mode and to receive a signal from the sensor member thus to drive the rotation pressing unit.

The rotation pressing unit may include a cam gear rotatably disposed on the axis of the movable guide and having a cam on which at least three pushing parts are formed to have distances different from a center thereof, respectively, a clutch gear coaxially connected to and rotated along with the cam gear, and having three stopping projections formed on a circumferential surface thereof, a driving gear to rotate the cam gear, and a solenoid to come in contact with the stopping projections of the clutch gear thus to restrict a rotation of the clutch gear.

The upper and the lower fixed guides and the upper and the lower guide parts of the movable guide may have a plurality of ribs and corresponding ribs, respectively, which are interdigitated with one another so as not to interfere with one another in a rotation of the movable guide.

The movable guide may rotate in a first position to open a passage between the upper fixed guide and the upper guide part of the movable guide, a second position to communicate a passage between the upper and the lower guide parts with the document discharge passage, and a third position to open a passage between the lower fixed guide and the lower guide part of the movable guide. At this time, preferably, but not necessarily, the passage between the upper fixed guide and the upper guide part at the first position of the movable guide is communicated with the first document reversing and waiting passage, and the passage between the lower fixed guide and the lower guide part at the third position of the movable guide is communicated with the second document reversing and waiting passage.

The foregoing and/or other aspects of the present general inventive concept may also be achieved by providing an image forming apparatus including a main body having a printer unit disposed therein, a scanner unit disposed on the main body, and an automatic document feeder in which a document discharge passage, a first document reversing passage to reverse a document to carry out a duplex scanning or printing mode, and a second document reversing passage to reverse the document again thus to collate it are formed separately from one another, so that while the document, both surfaces of which are scanned, is collated and discharged, a next document can be scanned.

The foregoing and/or other aspects of the present general inventive concept may also be achieved by providing image forming apparatus including a scanner unit to scan a document, and a document feeder to feed the document to the scanner unit, the document feeder including a first frame having a document admission passage of the document, a second frame to form a first document reversing and waiting passage with the first frame, a third frame to form a document discharging passage with the second frame, and a fourth frame to form a second document reversing and waiting passage with the third frame.

The foregoing and/or other aspects of the present general inventive concept may also be achieved by providing an image forming apparatus including a scanner unit to scan a document, and a document feeder to feed the document to the scanner, and the document feeder including a document admission passage to feed the document to the scanner unit, a first document reversing and waiting passage to feed the scanned document back to the document admission passage, so that the scanning unit scans another surface of the scanned document, a second document reversing and waiting passage to reverse the scanned document, and a document discharging passage to discharge the document received the document admission passage and the second document reversing and waiting passage.

The foregoing and/or other aspects of the present general inventive concept may also be achieved by providing an image forming apparatus including a scanner unit to scan a document, and a document feeder to feed the document to the scanner unit, to discharge the scanned document, and to reverse the scanned document in a duplex mode, the document feeder including a first passage to reverse the scanned document, and a second passage to reverse the document reversed in the first passage and scanned by the scanner unit before being discharged.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
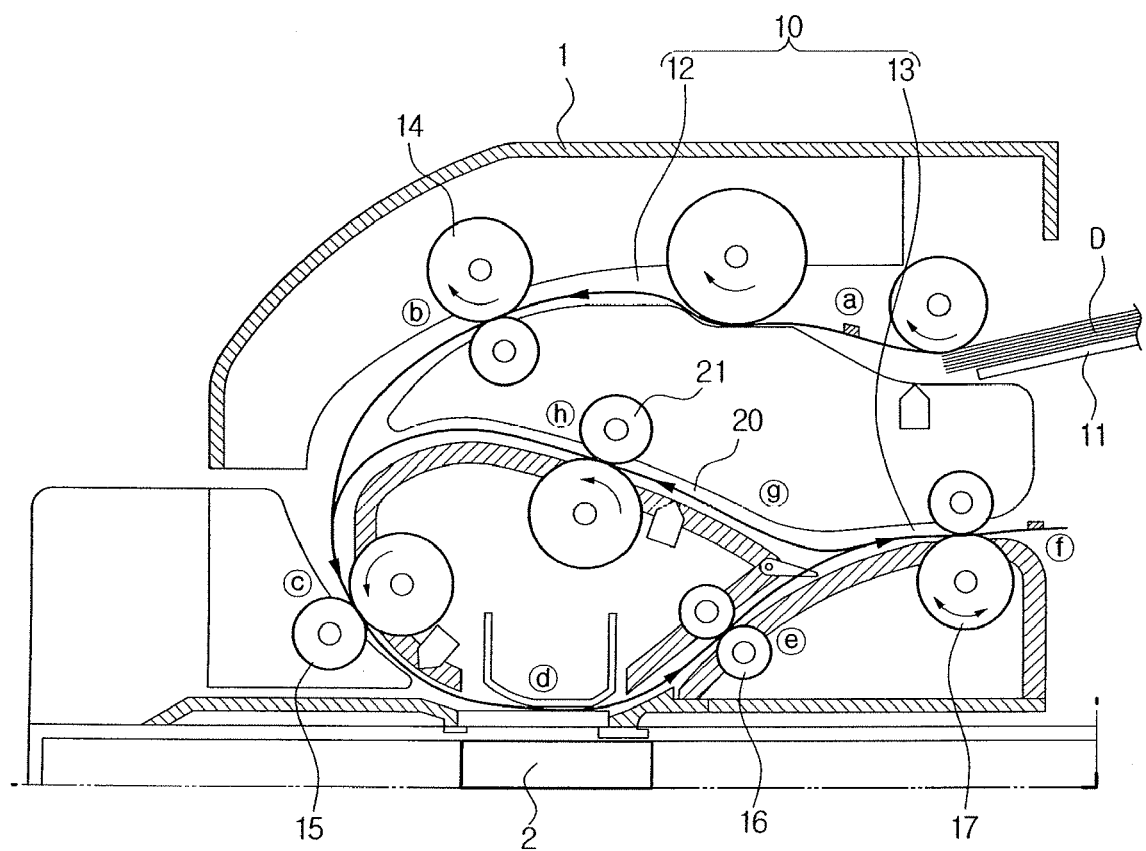
FIG. 1 is a schematic view exemplifying a conventional automatic document feeder provided in a general image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
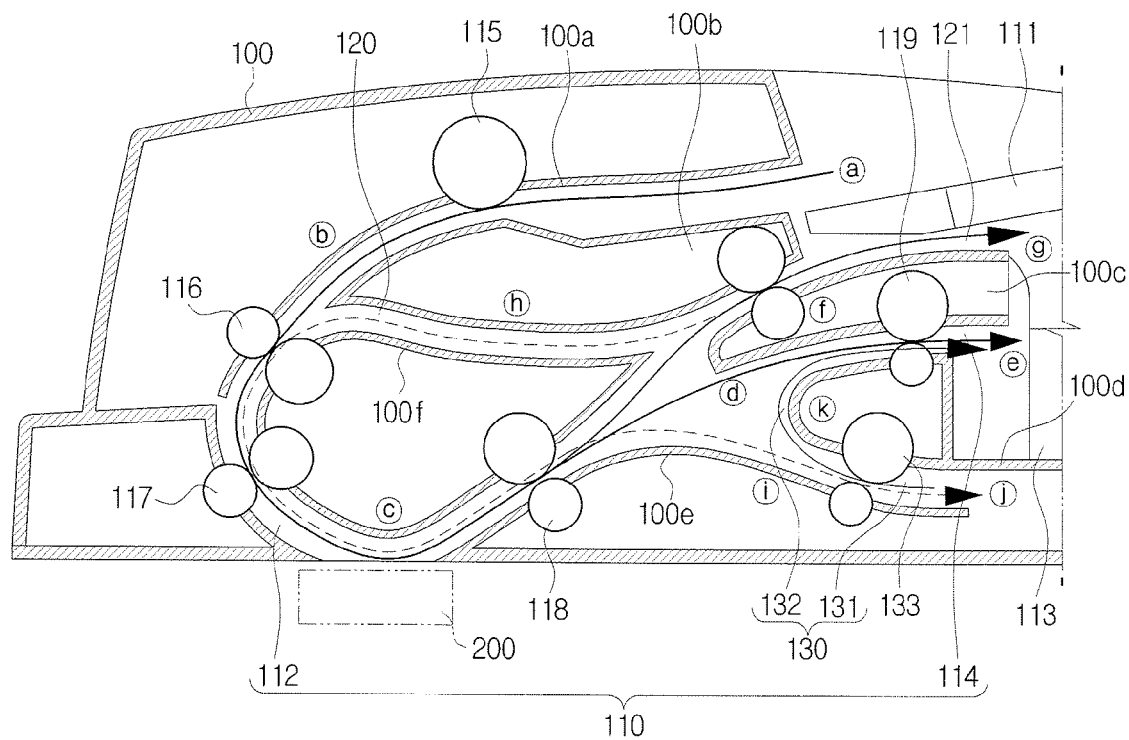
FIG. 2 is a schematic view exemplifying an automatic document feeder according to an embodiment of the present general inventive concept.
Figure 3:
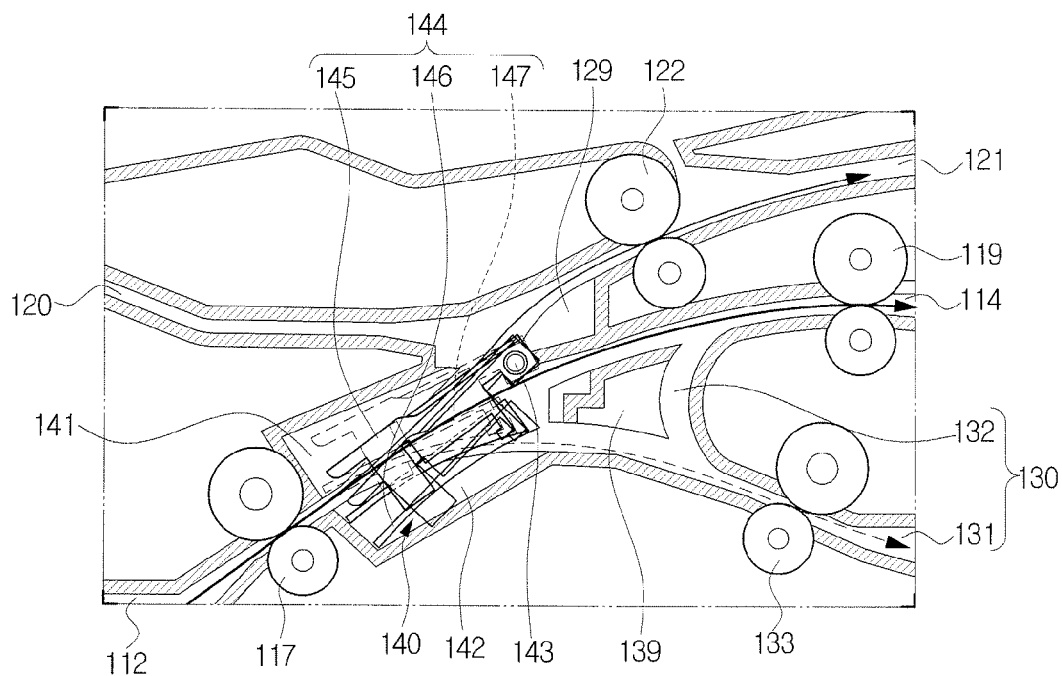
FIG. 3 is a detail view exemplifying a portion of the automatic document feeder of FIG. 2.

FIG. 2 is a schematic view exemplifying an automatic document feeder usable in an image forming and/or scanning apparatus according to an embodiment of the present general inventive concept, and FIG. 3 is a detail view exemplifying a portion of the automatic document feeder of FIG. 2. Referring to FIGS. 2 and 3, reference numerals 100 and 200 represent a document feeder frame and a document scanning part, respectively.

As illustrated in FIGS. 2 and 3, the automatic document feeder includes a single scan path 110, a duplex scan path 120, a document re-reversing path 130, and a document guide unit 140.

The single scan path 110 is provided with a document admission passage 112 to admit (or feed) a document placed on a document supplying tray 111 to the document scanning part 200 and a document discharge passage 114 to discharge the document scanned via the document scanning part 200 to a document discharging tray 113. A plurality of conveying rollers 115 through 119 are disposed in given intervals on the single scan path 110 to convey the document.

The duplex scan path 120 is provided with a first document reversing and waiting passage 121 diverged separately from the document discharge passage 114 on the single scan path 110 at the rear of the document scanning part 200. The duplex scan path 120 is connected to the single scan path 110 in front of the document scanning part 200 to reverse the document, one surface of which is scanned, and admit (or feed) the reversed document again to the document scanning part 200 to scan the other surface of the document. On the duplex scan path 120 is disposed a conveying roller 122, which is rotatable in forward and backward directions. The document may be a sheet of paper on which one or more images and/or text are formed on one side (surface) and/or the other side (surface).

The document re-reversing path 130 is provided with a second document reversing and waiting passage 131 diverged separately from the document discharge passage 114 on the single scan path 110 at the rear of the document scanning part 200, and a connecting passage 132 to connect the second document reversing and waiting passage 131 and the document discharge passage 114 with each other. The document re-reversing path 130 reverses the document, both surfaces of which are scanned, again and then discharges it through the document discharge passage 114, so that the discharged document is collated in the same page as that in an admission thereof in the document admission passage 112. On the document re-reversing path 130 is disposed a conveying roller 133, which is rotatable in forward and backward directions.

The other document feeder frame 100 may include a first frame 100a, a second frame 100b to form the document admission passage 112 with the first frame 100a, a third frame 100c to form the first document reversing and waiting passage 121 with the second frame 100b, a fourth frame 100d to form the document discharging passage 114 with the third frame 100c, a fifth frame 100e to form the second document reversing and waiting passage 131 with the fourth frame 100d, and a sixth frame 100f to form a reverse passage between the document admission passage 112 and the first document reversing and waiting passage 121 with the second frame 100b.

The automatic document feeder may be configured so that the document discharge passage 114, the first document reversing and waiting passage 121 to reverse the document having one surface scanned to carry out a duplex scanning or printing mode, and the second document reversing and waiting passage 131 to collate the document having both surfaces scanned and then discharge it are formed separately from one another. Accordingly, while the preceding document having both surfaces scanned is collated and discharged, the following document can be scanned.

That is, since a motion to reverse the document to carry out the duplex scanning or printing mode and a motion to reverse the document having both surfaces scanned again thus to collate it are carried out on separate passages, when the preceding document having both surfaces scanned is admitted into the second document reversing and waiting passage 131, a following document is admitted (or fed) into the document admission passage 112 and scanned, and the preceding document is reversed again and thus collated and then discharged through the document discharge passage 114.

To be more specific, in a conventional document feeder, a passage to reverse a document to carry out a duplex scanning or printing mode and a passage to reverse the document again thus to collate it use a document discharge passage in common. Accordingly, a following next document to be scanned cannot be admitted or fed into a document admission passage until the preceding document is reversed again and thus collated to be discharged. As a result, an interval between the documents admitted into the document admission passage 112 is lengthened. However, according to the exemplary embodiment of the present general inventive concept, since the motion to reverse the document again thus to collate it is separately carried out on the passage different from that in the motion to reverse the document to carry out the duplex scanning or printing mode, an interval between the admitted documents can be reduced, thereby improving a duplex scanning or printing efficiency, as compared with that of the conventional document feeder.

The document guide unit 140 of the automatic document feeder according to the exemplary embodiment of the present general inventive concept is formed at a diverging point of the first document reversing and waiting passage 121 and the second document reversing and waiting passage 131 to the single scan path 110 to guide and move the document scanned via the document scanning part 200 to a passage corresponding to a state thereof.

To be more specific, the document guide unit 140 guides the scanned document to the document discharge passage 114 in case of a single scanning or printing mode. However, the document guide unit 140 guides the document having the one surface scanned to the first document reversing and waiting passage 121 and guides the document having both surfaces scanned to the second document reversing and waiting passage 131 in case of a duplex scanning or printing mode.

Figure 4:
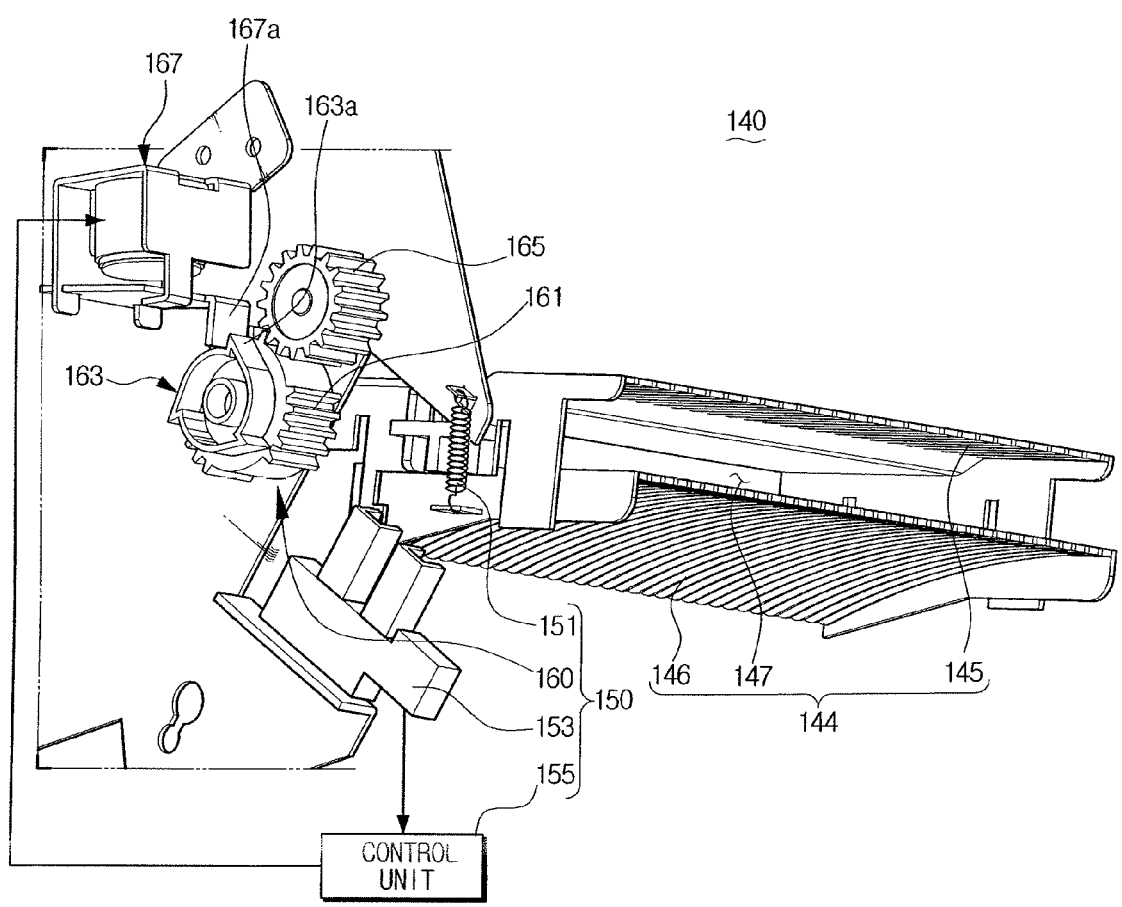
FIG. 4 is a perspective view exemplifying a document guide unit, which is a portion of the automatic document feeder of FIGS. 2 and 3.

As illustrated in FIGS. 3 and 4, the document guide unit 140 includes upper and lower fixed guides 141 and 142, a movable guide 144, and a rotation driving unit 150. The upper and lower fixed guides 141 and 142 are disposed above and below the diverging point, respectively. The movable guide 144 is disposed to be rotatabe about an axis of a shaft 143 between the upper and lower fixed guides 141 and 142, and has an upper guide part 145, a lower guide part 146, and a passage 147 formed between the upper guide part 145 and the lower guide part 146. The rotation driving unit 150 rotates the movable guide 144 in a position corresponding to a scanning mode. The shaft 143 is disposed on a first divider 129 located between the first document and waiting passage 121 and the document discharging passage 114. A second divider 139 is disposed between the document discharging passage 114 and the second document and waiting passage 131 to correspond to the connecting passage 132.

Also, the upper and the lower fixed guides 141 and 142 and the upper and the lower guide parts 145 and 146 of the movable guide 144 have a plurality of ribs (not illustrated) and corresponding ribs (not illustrated), respectively, which are interdigitated with one another so as not to interfere with one another when the movable guide 144 is rotated to change a position thereof.

The movable guide 144 rotates in a first position (see FIG. 5A) to open a first passage between the upper fixed guide 141 and the upper guide part 145 of the movable guide 144, a second position (see FIG. 5B) to connect a second passage, i.e., the passage 147, between the upper and the lower guide parts 145 and 146 to the document discharge passage 114, and a third position (see FIG. 5C) to open a third passage between the lower fixed guide 142 and the lower guide part 146 of the movable guide 144. At this time, the first passage between the upper fixed guide 141 and the upper guide part 145 at the first position of the movable guide 144 communicates with the first document reversing and waiting passage 121, and the third passage between the lower fixed guide 142 and the lower guide part 146 at the third position of the movable guide 144 communicates with the second document reversing and waiting passage 131. The upper guide part 145 may be a flat-shaped plate, and the lower guide part 146 may be a curved plate to form a connection, such as a curved surface, between the passage 112 and the passage 114 or 131.

Referring back to FIG. 4, the rotation driving unit 150 includes an elastic member 151, a rotation pressing unit 160, a sensor member 153, and a control unit 155. The elastic member 151 elastically supports the movable guide 144 in one of an upward direction and a downward direction. The rotation pressing unit 160 rotates the movable guide 144 by stages in an opposite direction to an elastic force direction of the elastic member 151. The sensor member 153 detects an initial position of the movable guide 144. The control unit 155 determines the scanning mode and receives a signal from the sensor member 153 thus to drive the rotation pressing unit 160.

The rotation pressing unit 160 is provided with a cam gear 161 rotatably disposed on the axis of the shaft 143 of the movable guide 144, a clutch gear 163 coaxially connected to and rotated along with the cam gear 161, a driving gear 165 to rotate the cam gear 161, and a solenoid 167 to selectively restrict a rotation of the clutch gear 163. The driving gear 165 may be connected to an external power source to rotate the cam gear 161 and/or to move the movable guide 141.

The cam gear 161 has a cam (not illustrated) in which at least three pushing parts are formed to have distances different from a center thereof, respectively. As the cam gear 161 rotates, the respective pushing parts of the cam gear 161 push the movable guide 144 by stages and thereby the movable guide 144 is rotated about the shaft 143 to change the position thereof, so that the movable guide 144 moves to the first position, the second position, or the third position.

The clutch gear 163 has three stopping projections 163a projected in equal intervals of 120° on a circumferential surface thereof to correspond to the respective pushing parts and to maintain a position of the movable guide 144, and the solenoid 167 has an actuating projection 167a, which comes in contact with the stopping projections 163a of the clutch gear 163.

The cam gear 161 is configured, so that a toothed part partly formed thereon is engaged with and rotated by the driving gear 165. Accordingly, if a rotation of the cam gear 161 is restricted by the solenoid 167, the driving gear 165 comes to face a non-toothed part of the cam gear 161. As a result, the driving gear 165 is rotated, but the cam gear 161 is not rotated. When the solenoid 167 releases the corresponding stopping projection 163a, the cam gear 161 rotates by the driving gear 165 to move the movable guide 141.

In the present embodiment, the rotation pressing unit 150 rotating the movable guide 144 is illustrated and explained as having the construction as described above, but the present general inventive concept is not limited thereto. For instance, it is possible for the rotation pressing unit 150 to configure in a construction that connects a motor, for example, a stepping motor, which is rotatable in forward and backward directions, to the shaft 143 of the movable guide 144 and properly controls a drive of the motor with the control unit 155 thus to change a position of the movable guide 144 according to the scanning mode.

Hereinafter, an operation of the automatic document feeder constructed as described above will be described in details with reference to FIGS. 4 through 5C.

Figure 5A:
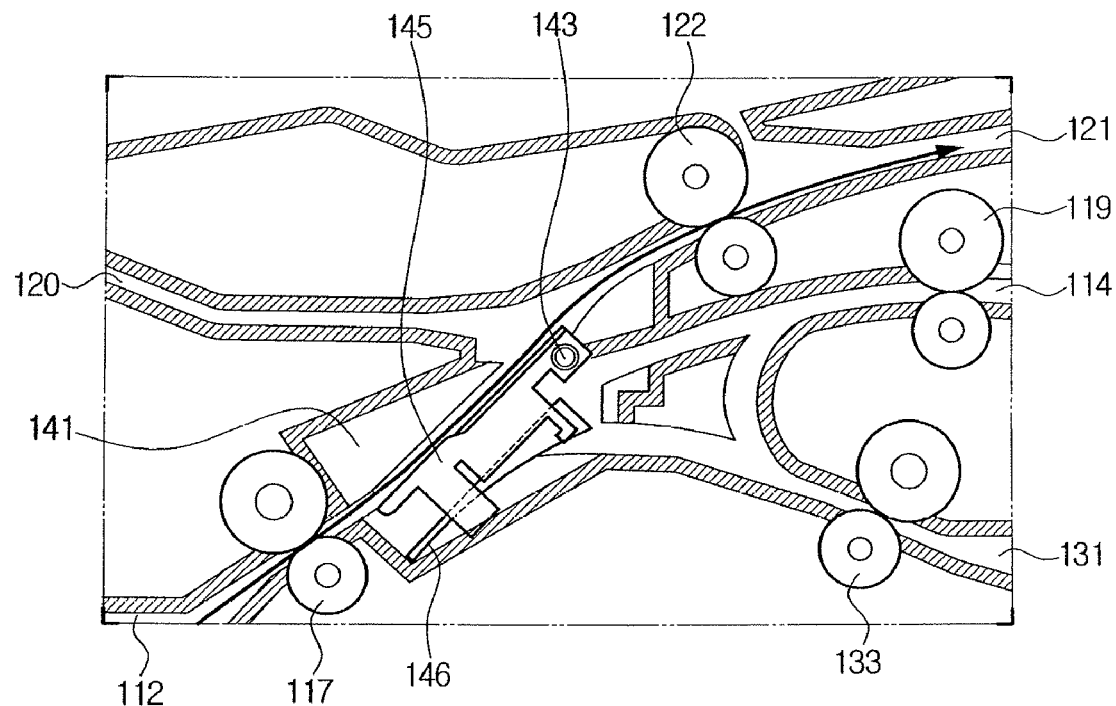
FIGS. 5A, 5B and 5C are views exemplifying an operation of the automatic document feeder of FIGS. 2 and 3.
Figure 5B:
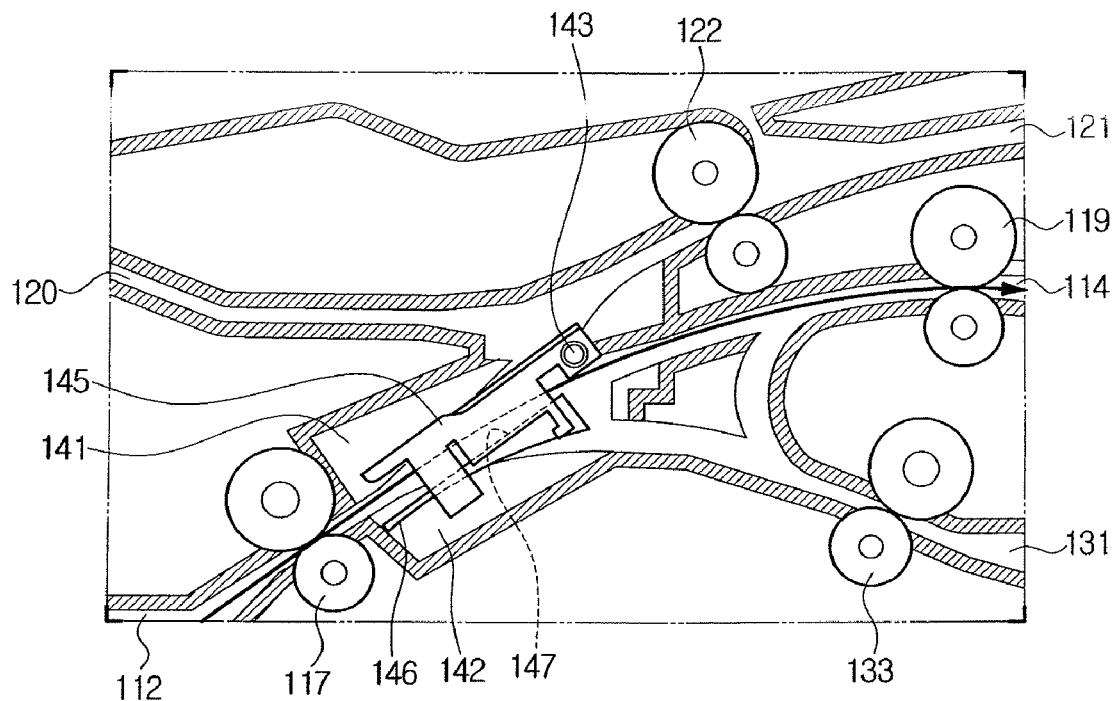

In a single scanning or printing mode, the movable guide 144 is located at the second position as illustrated in FIG. 5B by the control unit 155. That is, the movable guide 144 is positioned, so that the passage 147 of the movable guide 144 is connected to the document admission passage 112 and the document discharge passage 114 to communicate with each other. After moving via the document scanning part 200, a document is conveyed into the document discharge passage 114 through the passage 147 and discharged therethrough. The scan path in the single scanning or printing mode as described above is the same as that of the conventional automatic document feeder. That is, as illustrated in FIG. 2, the document passes through paths ⓐ, ⓑ, ⓒ, ⓓ, and ⓔ.

In a duplex scanning or printing mode, the movable guide 144 is located at the first position as illustrated in FIG. 5A by the control unit 155. That is, the movable guide 144 is rotated in a position where the passage between the upper fixed guide 141 and the upper guide part 145 of the movable guide 144 is opened so that the document admission passage 112 is connected to the first document reversing and waiting passage 121. With this, a document, one surface of which is scanned, is conveyed to the first document reversing and waiting passage 121, admitted into the duplex scan path 120 in a reversed state by rotating the conveying roller 122 in a backward direction, and then conveyed passing through the document scanning part 200 in the reversed state.

Figure 5C:
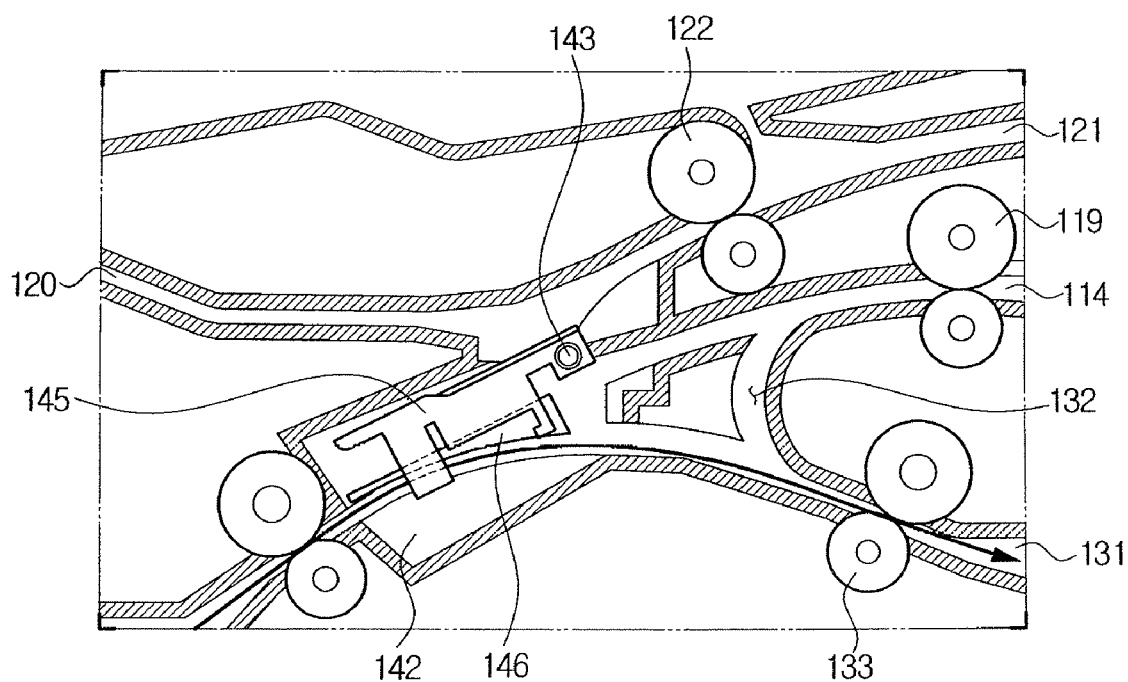

Next, the control unit 155 moves the movable guide 144 in the first position as illustrated in FIG. 5C. That is, the movable guide 144 is rotated in a position where the passage between the lower fixed guide 142 and the lower guide part 146 of the movable guide 144 is opened so that the document admission passage 112 is connected to the second document reversing and waiting passage 131. Accordingly, the document, both surfaces of which are scanned, is conveyed to the second document reversing and waiting passage 131, conveyed via the connecting passage 132 in a re-reversed state by rotating the conveying roller 133 in a backward direction, and then discharged through the document discharge passage 114 in the re-reversed state. The document path in the duplex scanning or printing mode as described above is made up of an order of paths ⓐ, ⓑ, ⓒ, ⓕ, ⓖ, ⓗ, ⓓ, ⓒ, ⓘ, ⓙ, ⓚ and ⓔ, as illustrated in FIG. 2. Here, the document is discharged to have a scanned surface face down in the single scan mode, and the document is also discharged to have the same scanned surface face down in the duplex scanning mode since the document has been re-reversed.

On the other hand, while the document, the both surfaces of which are scanned in the duplex scanning or printing mode as described above, is reversed again and thus collated (paths ⓘ, ⓙ, ⓚ and ⓔ in the document path), the following document (next document) is admitted (fed) to carry out the duplex scanning operation (paths ⓐ, ⓑ, ⓒ, ⓕ, ⓖ, ⓗ, ⓓ, and ⓒ in the document path). That is, since the document discharge motion, the document reversion motion, and the document re-reversion motion are carried out on separate passages, the preceding document and the following document are not overlapped or interfered with each other.

Accordingly, in the duplex scanning or printing mode, documents can be fed in shorter intervals to carry out the duplex scanning operation.

Figure 6:
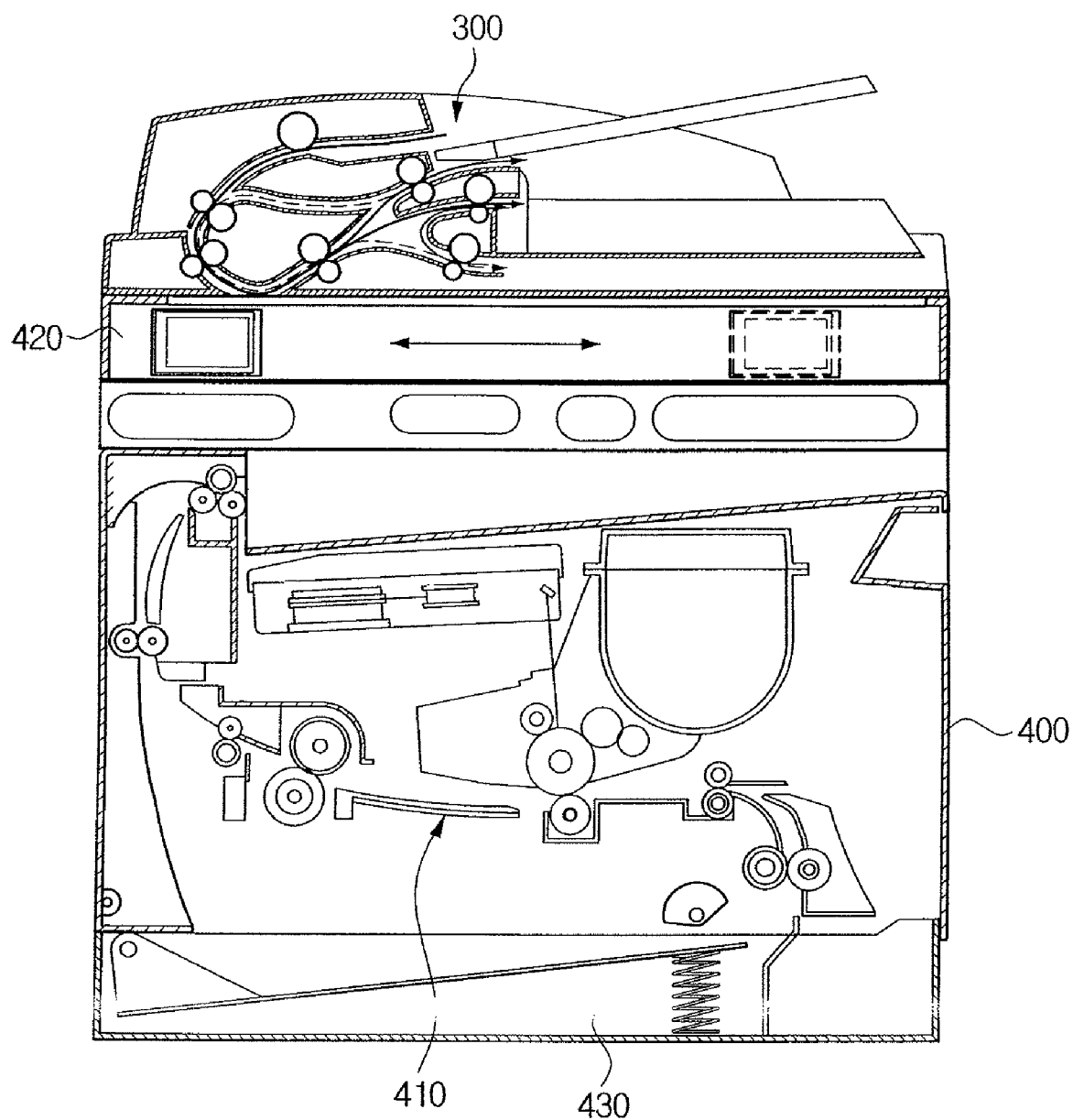
FIG. 6 is a schematic view exemplifying an image forming apparatus having an automatic document feeder according to an embodiment of the present general inventive concept.

FIG. 6 illustrates a multifunction machine, such as an image forming apparatus, having an automatic document feeder 300 according to an embodiment of the present general inventive concept. As illustrated in FIG. 6, the image forming apparatus includes a printer unit 410 disposed in a main body 400, and a scanner unit 420 mounted on the main body 400. An automatic document feeder 300 is disposed on the scanner unit 420.

The scanner unit 420 scans an image from a document, which is continuously conveyed by the automatic document feeder 300. The scanned image information is transmitted to the printer unit 410, and the printer unit 410 prints or copies the scanned image on a printing paper. The printing paper is supplied to the printer unit 410 from a paper supplying unit 430 disposed below the main body 400.

In the printing operation of the image forming apparatus as described above, particularly, a duplex scanning or printing mode, the documents are scanned in shorter intervals by the automatic document feeder 300 than a conventional image forming apparatus. Accordingly, a printing speed can be increased. According to an experiment, in the image forming apparatus according to the exemplary embodiment of the present general inventive concept, a printing efficiency in the duplex printing mode was approximately 90% of that in the single printing mode. In the conventional image forming apparatus, the printing efficiency in the duplex printing mode usually is approximately 50% of that in the single printing mode, the duplex printing speed of the image forming apparatus according to the exemplary embodiment of the present general inventive concept can be evaluated at an epoch of a shortened scanned period.

As apparent from the foregoing description, according to the exemplary embodiments of the present general inventive concept as described above, the automatic document feeder and the image forming apparatus can improve the scanning or printing efficiency in the duplex scanning or printing mode, thereby realizing a high speed image forming apparatus, that is, a high speed multifunction machine, copier, printer or the like.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An automatic document feeder comprising:
a single scan path having a document admission passage to admit a document;
a document scanning part to scan the document;
a document discharge passage to discharge the scanned document;
a duplex scan path having a first document reversing and waiting passage diverged separately from the document discharge passage on the single scan path at a rear portion of the document scanning part to reverse the document, one surface of which is scanned, and admit the reversed document again to the document scanning part; and
a document re-reversing path having a second document reversing and waiting passage diverged separately from the document discharge passage on the single scan path at the rear of the document scanning part to reverse the document, both surfaces of which are scanned, again and send the re-reversed document to the document discharge passage.

2. The automatic document feeder of claim 1, further comprising:
a document guide unit formed at a diverging point between the first document reversing and waiting passage and the second document reversing and waiting passage to the single scan path to guide the scanned document to a corresponding passage.

3. The automatic document feeder of claim 2, wherein the document guide unit guides the scanned document to the document discharge passage in a single scanning or printing mode, and guides the document having the one surface scanned to the first document reversing and waiting passage, and guides the document having both surfaces scanned to the second document reversing and waiting passage in a duplex scanning or printing mode.

4. The automatic document feeder of claim 2, wherein the document guide unit comprises:
upper and lower fixed guides disposed above and below the diverging point, respectively;
a movable guide disposed to be rotatabe about an axis between the upper and lower fixed guides, and having an upper guide part, a lower guide part, and a passage formed between the upper guide part and the lower guide part; and
a rotation driving unit to rotate the movable guide in a position corresponding to a scanning mode.

5. The automatic document feeder of claim 4, wherein the upper and the lower fixed guides and the upper and the lower guide parts of the movable guide comprises a plurality of ribs and corresponding ribs, respectively, which are interdigitated with one another so as not to interfere with one another in a rotation of the movable guide.

6. The automatic document feeder of claim 5, wherein the rotation driving unit comprises:
a motor connected to the axis of the movable guide; and
a control unit to control a drive of the motor according to a scan mode.

7. The automatic document feeder of claim 5, wherein the rotation driving unit comprises:
an elastic member to elastically support the movable guide in one of an upward direction and a downward direction;
a rotation pressing unit to rotate the movable guide by stages in an opposite direction to an elastic force direction of the elastic member;
a sensor member to detect an initial position of the movable guide; and
a control unit to determine a scanning mode, to receive a signal from the sensor member, and to drive the rotation pressing unit according to the signal.

8. The automatic document feeder of claim 7, wherein the rotation pressing unit comprises:
a cam gear rotatably disposed on the axis of the movable guide and having a cam on which a plurality of pushing parts are formed to have distances different from a center thereof, respectively;
a clutch gear coaxially connected to and rotated along with the cam gear, and having a plurality of stopping projections formed on a circumferential surface thereof;
a driving gear to rotate the cam gear; and
a solenoid to come in contact with the stopping projections of the clutch gear thus to restrict a rotation of the clutch gear.

9. The automatic document feeder of claim 8, wherein the movable guide rotates in a first position to form a passage between the upper fixed guide and the upper guide part of the movable guide, a second position to form a passage between the upper and the lower guide parts with the document discharge passage, and a third position to form a passage between the lower fixed guide and the lower guide part of the movable guide.

10. The automatic document feeder of claim 9, wherein the passage between the upper fixed guide and the upper guide part at the first position of the movable guide communicates with the first document reversing and waiting passage, and the passage between the lower fixed guide and the lower guide part at the third position of the movable guide communicates with the second document reversing and waiting passage.

11. An image forming apparatus comprising:
a main body having a printer unit disposed therein;
a scanner unit disposed on the main body; and
an automatic document feeder to continuously a document to a document scanning part of the scanner unit,
wherein the automatic document feeder comprises:
a single scan path having a document admission passage to admit a document,
a document scanning part to scan the document,
a document discharge passage to discharge the scanned document,
a duplex scan path having a first document reversing and waiting passage diverged separately from the document discharge passage on the single scan path at a rear portion of the document scanning part to reverse the document, one surface of which is scanned, and admit the reversed document again to the document scanning part, and
a document re-reversing path having a second document reversing and waiting passage diverged separately from the document discharge passage on the single scan path at the rear of the document scanning part to reverse the document, both surfaces of which are scanned, again and send the re-reversed document to the document discharge passage.

12. The apparatus of claim 11, further comprising:
a document guide unit formed at a diverging point between the first document reversing and waiting passage and the second document reversing and waiting passage to the single scan path to guide the scanned document to a corresponding passage.

13. The apparatus of claim 12, wherein the document guide unit guides the scanned document to the document discharge passage in case of a single scanning or printing mode, guides the document having the one surface scanned to the first document reversing and waiting passage, and guides the document having both surfaces scanned to the second document reversing and waiting passage in case of a duplex scanning or printing mode.

14. The apparatus of claim 12, wherein the document guide unit comprises:
upper and lower fixed guides disposed above and below the diverging point, respectively;
a movable guide disposed to be rotatabe about an axis between the upper and lower fixed guides, and having an upper guide part, a lower guide part, and a passage formed between the upper guide part and the lower guide part; and
a rotation driving unit to rotate the movable guide in a position corresponding to a scanning mode.

15. The apparatus of claim 14, wherein the rotation driving unit comprises:
a motor connected to the axis of the movable guide; and
a control unit to control a drive of the motor according to a scan mode.

16. The apparatus of claim 14, wherein the rotation driving unit comprises:
an elastic member to elastically support the movable guide in one of an upward direction and a downward direction;
a rotation pressing unit to rotate the movable guide by stages in an opposite direction to an elastic force direction of the elastic member;
a sensor member to detect an initial position of the movable guide; and
a control unit to determine a scanning mode and to receive a signal from the sensor member, and to drive the rotation pressing unit according to the signal.

17. The apparatus of claim 16, wherein the rotation pressing unit comprises:
a cam gear rotatably disposed on the axis of the movable guide and having a cam on which a plurality of pushing parts are formed to have distances different from a center thereof, respectively;
a clutch gear coaxially connected to and rotated along with the cam gear, and having a plurality of stopping projections formed on a circumferential surface thereof,
a driving gear to rotate the cam gear; and
a solenoid to come in contact with the stopping projections of the clutch gear thus to restrict a rotation of the clutch gear.

18. The apparatus of claim 14, wherein the upper and the lower fixed guides and the upper and the lower guide parts of the movable guide comprise a plurality of ribs and corresponding ribs, respectively, which are interdigitated with one another so as not to interfere with one another in a rotation of the movable guide.

19. The apparatus of claim 17, wherein the movable guide rotates in a first position to form a passage between the upper fixed guide and the upper guide part of the movable guide, a second position to form a passage between the upper and the lower guide parts with the document discharge passage, and a third position to form a passage between the lower fixed guide and the lower guide part of the movable guide.

20. The apparatus of claim 19, wherein the passage between the upper fixed guide and the upper guide part at the first position of the movable guide communicates with the first document reversing and waiting passage, and the passage between the lower fixed guide and the lower guide part at the third position of the movable guide communicates with the second document reversing and waiting passage.

21. A image forming apparatus comprising:
a scanner unit to scan a document; and
a document feeder to feed the document to the scanner unit, and the document feeder comprising:
a first frame having a document admission passage of the document,
a second frame to form a first document reversing and waiting passage with the first frame,
a third frame to form a document discharging passage with the second frame, and
a fourth frame to form a second document reversing and waiting passage with the third frame.

22. An image forming apparatus comprising:
a scanner unit to scan a document; and
a document feeder to feed the document to the scanner, and comprising:
a document admission passage to feed the document to the scanner unit,
a first document reversing and waiting passage to feed the scanned document back to the document admission passage, so that the scanning unit scans another surface of the scanned document, a second document reversing and waiting passage to reverse the scanned document, and a document discharging passage to discharge the document received by the document admission passage and the second document reversing and waiting passage.

23. An image forming apparatus comprising:

a scanner unit to scan a document; and a document feeder to feed the document to the scanner unit, to discharge the scanned document, and to reverse the scanned document in a duplex mode, the document feeder including a first passage to reverse the scanned document, and a second passage to reverse the document reversed in the first passage and scanned by the scanner unit before being discharged.

24. The image forming apparatus of claim 23, wherein the document feeder simultaneously feeds the scanned document and feeds a new document to the scanner unit.

25. The image forming apparatus of claim 23, wherein the document feeder simultaneously reverses the scanned document and feeds a new document to the scanner unit.

26. The image forming apparatus of claim 23, wherein the document feeder simultaneously discharges the scanned document and feeds a new document to the scanner unit.

27. The image forming apparatus of claim 23, wherein the first passage and the second passage are spaced-apart from each other.

28. The image forming apparatus of claim 23, wherein the document feeder feeds a new document to the scanner unit when the document is in one of the first passage and the second passage.

29. The image forming apparatus of claim 23, wherein the document feeder comprises a discharge passage disposed between the first passage and the second passage to discharge the scanned document in the single and duplex scan modes.

30. The image forming apparatus of claim 23, further comprising:

a movable guide to form a passage connected to one of the first passage and the second passage to that the scanned document is discharged.

31. The image forming apparatus of claim 23, further comprising:

a discharge passage to discharge the scanned document in the single and duplex scan modes; and a connection passage to connect the second passage to the discharge passage.

32. The image forming apparatus of claim 23, further comprising:

an admission passage to feed the document to the scanner unit in the single and duplex scan modes, to be connected with the first passage to receive the reversed document from the first passage, to be connected with the second passage;

a discharge passage connected to one of the admission passage and the second passage to discharge the scanned document in the single and duplex scan modes; and a connection passage to connect the second passage to the discharge passage.

* * * * *